May 14, 1935.  C. FINCH  2,001,604
SELF STARTING SYNCHRONOUS MOTOR
Filed June 27, 1933
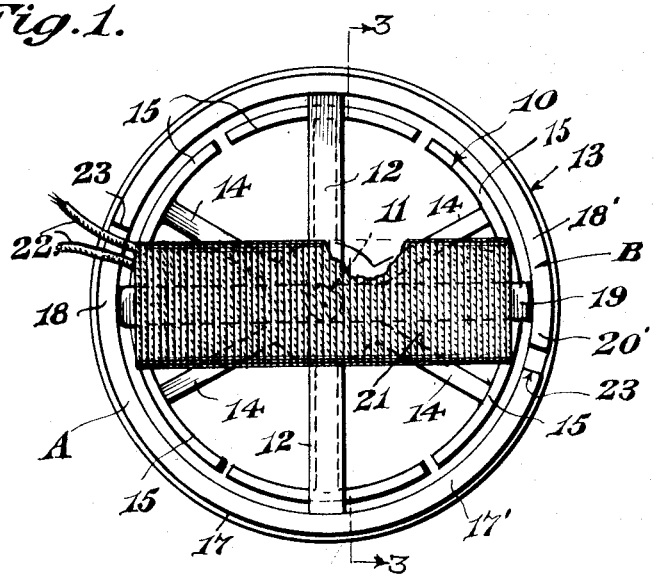
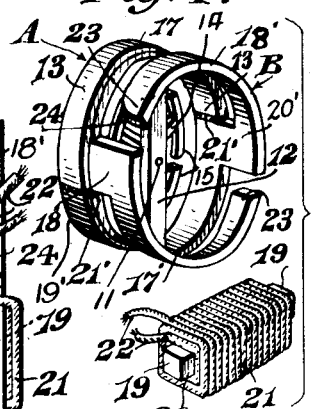
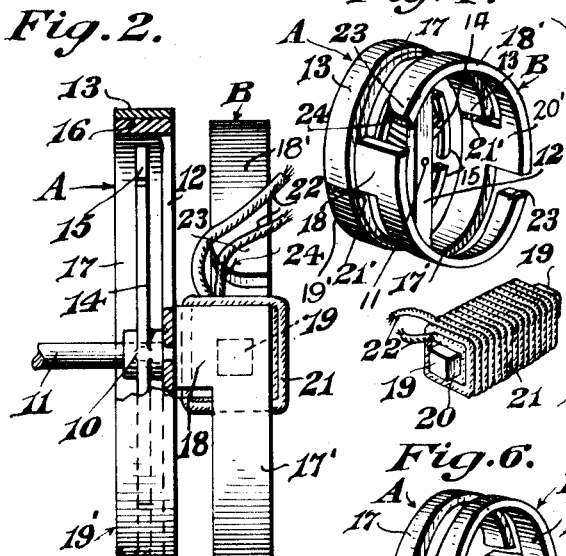
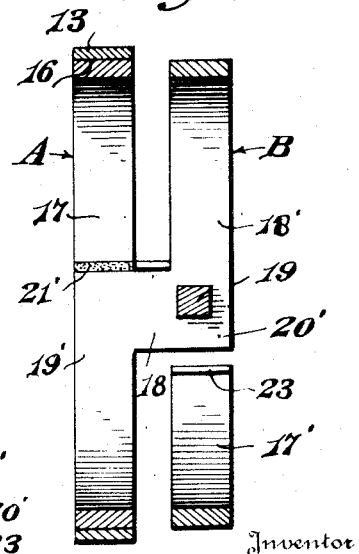
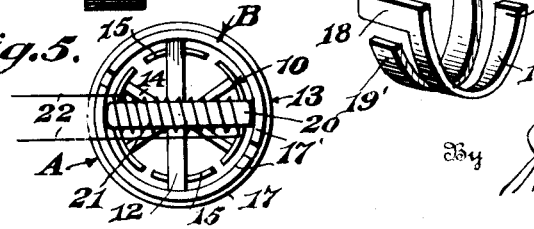
Inventor
Clark Finch,
By Irving A. McCathran
Attorney Patented May 14, 1935

2,001,604

UNITED STATES PATENT OFFICE 2,001,604

SELF-STARTING SYNCHRONOUS MOTOR

Clark Finch, West Palm Beach, Fla.

Application June 27, 1933, Serial No. 677,942

4 Claims. (Cl. 172—275)

This invention relates to motors and has special reference to a self-starting synchronous motor.

More particularly the invention relates to small motors of this type wherein the rotor is of a suitably constructed iron or steel member, and wherein there is provided a field magnet receiving alternating current.

In the types of self-starting synchronous motors now in common use, it is common to have one or more field poles each divided into sections and which sections may be arranged to assist or oppose each other, such motors being termed "split-pole" motors.

One important object of the present invention is to provide an improved construction of motor wherein the necessity of splitting field poles or lagging with brass is eliminated and wherein plain solid field poles may be used.

A second important object of the invention is to provide an improved form of motor of the type described wherein, for motors of equal size, a stronger starting torque is obtained than is possible with a split-pole motor.

A third important object of the invention is to provide an improved motor of this class having very simple and compact construction so that it may be made in small sizes.

With the above and other objects in view, as will be hereinafter apparent, the invention consists in general of certain novel details of construction and combination of parts hereinafter fully described, illustrated in the accompanying drawing, and specifically claimed.

In the accompanying drawing, like characters of reference indicate like parts in the several views, and:—

Figure 1 is an end elevation of a motor constructed in accordance with this invention;

Figure 2 is a similar side elevation of such a motor;

Figure 3 is a section taken on the line 3—3 of Figure 1;

Figure 4 is a perspective view of the field magnet and rotor, with the coil in a dismounted position;

Figure 5 is a diagrammatic view of the field magnet, rotor and coil; and

Figure 6 is a perspective view showing the construction and arrangement of the sections of the field magnet removed from the supporting ring or band.

In carrying out this invention, I provide a rotor 10 which is carried by a shaft 11, and this shaft 11 is journaled upon a suporting bar 12 of non-magnetic material. It will be understood that the shaft 11 will be rotatably mounted in any desired manner. The rotor 10 is provided with a plurality of radiating arms 14 which arms 14 support segmental members 15 and these segmental members 15 are arranged in relatively close proximity to the field magnet hereinafter described. The rotor 10 is adapted to rotate freely within the field magnet, as shown clearly in the drawing.

The field magnet comprises a pair of sections A and B, which are substantially Z-shaped in formation and are arranged in staggered spaced relation as is shown clearly in Figure 6 of the drawing. The section A comprises a substantially semicircular or curved arm 17 and an offset oppositely extending curved semicircular arm 17' the arms 17 and 17' being connected by means of a laterally extending neck portion 18. The section B is similarly constructed to the section A and comprises a substantially semicircular or curved arm 18' and a substantially semicircular or curved arm 19', the arms 18' and 19' being oppositely extending and arranged in staggered relation with respect to the arms 17 and 17' of the section A when assembled, as shown in Figure 6. The arms 18' and 19' are connected by means of a laterally extending neck portion 20'. The arms 17 and 19' are securely fastened or soldered to the underface of a supporting band 13 formed of non-magnetic material and the bar 12 is soldered or otherwise secured to the inner faces of the respective arms 17 and 19'. Since the arms 17 and 19' are soldered or fixedly secured to the underface of the ring or band 13 it will be seen that the arms 18' and 17' will be held in spaced relation with respect to the band or ring 13 and the arms 17 and 19' due to the manner in which the respective arms of the sections A and B are connected by the neck portions 18 and 20' respectively. In assembling the sections A and B within the band or ring 13, the arms 17 and 19' are soldered or otherwise secured and a suitable strip of soldering material 21' may be inserted between the ends of the respective arms 17 and 19 and the neck portions 18 and 20' as indicated in Figure 4. In view of this assembly, it will be seen that the two sections of the field magnet A and B when assembled are arranged in staggered relation or overlapping relation, these sections being each formed of a substantially Z-shaped structure.

Due to the fact that the arms of the sections A and B are semicircular in formation extending in opposite directions, they constitute together substantially a circular split ring, the end 23 of the arm 18' terminating in spaced relation with respect to the neck portion 18, as shown in Figures 2, 3 and 5. This circular formation of the arms will permit the coil 21 to be seated between the neck portions 18 and 20' and span the distance between the neck portions, the ends 19 of the core 20 resting against the inner faces of the neck portions 18 and 20', and will be held in position in this manner as illustrated, thereby permitting the coil to be readily removed if desired for the purpose of repair or replacement without requiring the use of a tool. Both of the lead-in wires 22 extend between the neck portion 18 and the free end portion 23 of the arm 18', and this free end of the arm is preferably curved, as shown at 24, to permit easy passage of the wires between the end of the arm and the neck portion 18, as shown in Figure 2. It will therefore be seen that the coil 21 is detachable and removable from the field magnet or metallic support which constitutes the field magnet.

From the foregoing description it will be seen that a very simple and efficient structure has been provided which is especially adapted for a self-starting synchronous motor having smooth plain poles and not requiring splitting or lagging, as is now required in most motors of this character. Furthermore, it will be seen that the curved or substantially semicircular arms of the sections of the field magnet extend below and above the coil or follow the contour of the ring 13, there being a slight gap between the end of one arm 17 and the adjoining arm. The sections of the field magnet therefore are substantially Z-shaped when taken in conjunction with the ring 13 and are curved toward the rotor and coil. These arms 17, 17', 18' and 19' also constitute extensions which give a stronger starting effect as well as a stronger driving force and cause less heat to be generated in the coil. The close proximity of the rotor to the coil also has a boosting effect and the particular arrangement of the parts provide a very simple and efficient motor.

From the foregoing description, it will be seen that a self-starting synchronous electric motor has been produced for use with the usual house current, the motor being small, efficient and economical to build and operate. During a long series of experiments, I have found that around the field magnets of an alternating current electromagnet are rings or lines of magnetic force moving towards the ends or tips of the field magnets, and these rings or lines of force exert a drag or pull upon adjacent magnetic material in the direction in which they are moving. Therefore, when the field magnets of an alternating current electro-magnet are bent or curved around a suitable rotor, they exert a strong turning or revolving force (non-synchronous) towards the ends of the field magnets. This gives the initial start to the rotor so that the synchronous action can pick up the rotor and control it. Consequently, as a result of the particular structure, a very sharp synchronous action will be developed through the use of a remarkably small and light motor unit.

It is obvious that changes may be made in the form and construction of the invention without departing from the material principles thereof. It is not therefore desired to confine the invention to the exact form herein shown and described, but it is desired to include all such as properly coming within the scope claimed.

Having described the invention, what is claimed as new is:—

1. In a motor of the class described, a rotor, a ring surrounding said rotor, means for supporting said rotor within said ring, offset oppositely extending curved arms of magnetic material conforming to the contour of said rotor and ring, one end of each arm being supported upon said ring, the opposite end of each arm being slightly spaced from the adjoining arms, both arms constituting a substantially circular casing, and a coil interposed between the arms.

2. In a motor of the class described, a rotor, a ring surrounding said rotor, means for supporting said rotor within said ring, offset oppositely extending curved arms of magnetic material conforming to the contour of said rotor and ring, one end of each arm being supported upon said ring, the opposite end of each arm being slightly spaced from the adjoining arm, both arms constituting a substantially circular casing, and a coil having a core, and said core having projecting ends adapted to removably engage the inner faces of the opposite arms.

3. In a motor of the class described, a rotor, a ring surrounding said rotor, means for supporting said rotor within said ring, offset oppositely extending curved arms of magnetic material conforming to the contour of said rotor and ring, one end of each arm being supported upon said ring, the opposite end of each arm being slightly spaced from the adjoining arm, both arms constituting a substantially circular casing, a coil having a core, said core having a projecting end adapted to removably engage the inner faces of the opposite arms, and a lead-in wire connected to said coil and extending between the free end of one arm and the anchored end of the other arm.

4. A motor of the class described comprising a rotor, a field magnet comprising a plurality of substantially similarly constructed sections, each section having oppositely curved arms extending around the rotor, the arms of one section being connected together in a manner to support the arms in offset relation, a securing band for supporting one arm of each section and holding the other arm of each section in spaced relation from the first mentioned arms, and an energizing coil supported within said sections.

CLARK FINCH.